United States Patent
Brown et al.

(10) Patent No.: US 12,306,893 B2
(45) Date of Patent: May 20, 2025

(54) FLIGHT-RELATED DATA MANAGEMENT SYSTEM

(71) Applicant: RTX CORPORATION, Farmington, CT (US)

(72) Inventors: Ibrahim Brown, Jewett City, CT (US); Cami L. Santor, Glastonbury, CT (US); Roger Aiudi, Granby, CT (US); Patrick J. Smith, Vernon, CT (US); Fidel Galano, Chicago, IL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/459,521

(22) Filed: Sep. 1, 2023

(65) Prior Publication Data

US 2025/0077600 A1    Mar. 6, 2025

(51) Int. Cl.
| | |
|---|---|
| *G06F 16/00* | (2019.01) |
| *G06F 16/25* | (2019.01) |
| *G06F 16/27* | (2019.01) |
| *G06F 16/9538* | (2019.01) |

(52) U.S. Cl.
CPC ........ *G06F 16/9538* (2019.01); *G06F 16/258* (2019.01); *G06F 16/27* (2019.01)

(58) Field of Classification Search
CPC ..... G06F 16/9538; G06F 16/258; G06F 16/27
See application file for complete search history.

(56) References Cited

U.S. PATENT DOCUMENTS

| | | | | |
|---|---|---|---|---|
| 6,480,770 B1 * | 11/2002 | Wischmeyer | .......... | B64D 45/00 701/13 |
| 6,606,546 B2 * | 8/2003 | Sinex | ................. | G06Q 10/0875 701/32.7 |
| 7,983,809 B2 * | 7/2011 | Kell | .................... | G06Q 10/0875 340/439 |

(Continued)

OTHER PUBLICATIONS

European Search Report for European Patent Application No. 24198000.2 dated Jan. 9, 2025.

*Primary Examiner* — Noosha Arjomandi
(74) *Attorney, Agent, or Firm* — Carlson, Gaskey & Olds, P.C.

(57) ABSTRACT

A method of providing access to flight-related data of aircraft includes correlating a plurality of data sets that are different from each other and each contain flight-related data for one or more aircraft engines, to determine a plurality of flights of the one or more aircraft engines that correspond to the plurality of data sets. At least a portion of the flight-related data describes operation of the aircraft engines during the plurality of flights. The correlating is performed based on metadata of the plurality of data sets, and the plurality of data sets includes a plurality of first data sets that utilize a plurality of different schemas. The method also includes creating, for each of the plurality of flights and based on the correlating, a respective flight object that represents the flight and includes a plurality of discrete flight data objects that each correspond to a respective one of the plurality of data sets for the flight; and utilizing the flight object for one of the flights to provide access to one or more of the data sets for said one of the flights. A system for aircraft data management is also disclosed.

18 Claims, 7 Drawing Sheets

(56) References Cited

U.S. PATENT DOCUMENTS

| | | | | |
|---|---|---|---|---|
| 8,234,068 | B1* | 7/2012 | Young | G08G 5/0086 |
| | | | | 701/410 |
| 10,057,144 | B2 | 8/2018 | Lam et al. | |
| 10,364,049 | B2* | 7/2019 | Floyd | G06Q 10/10 |
| 11,681,929 | B2 | 6/2023 | Strong | |
| 2011/0144897 | A1 | 6/2011 | Dunsky | |
| 2013/0013134 | A1* | 1/2013 | Lieu | G01C 23/005 |
| | | | | 701/14 |
| 2017/0124780 | A1* | 5/2017 | Jensen | G08G 5/26 |
| 2017/0233105 | A1* | 8/2017 | Vali | B64F 5/40 |
| | | | | 701/3 |
| 2019/0019354 | A1* | 1/2019 | Jordan | B64D 33/00 |
| 2019/0177008 | A1* | 6/2019 | Floyd | G06F 3/048 |
| 2020/0219409 | A1* | 7/2020 | Cambon | G08G 5/51 |
| 2020/0371678 | A1* | 11/2020 | Angelini | G06F 16/2425 |
| 2021/0264497 | A1* | 8/2021 | Annakov | G06Q 30/0202 |
| 2022/0238025 | A1 | 7/2022 | McCann et al. | |
| 2023/0177966 | A1* | 6/2023 | Janakiraman | G08G 5/30 |
| | | | | 701/3 |
| 2024/0002067 | A1* | 1/2024 | Guthrie | B64C 19/00 |
| 2024/0105062 | A1* | 3/2024 | Leones | G08G 5/21 |

* cited by examiner

FIG.5A

| No. | FLIGHT OBJECT | REPORT | ESN 1 | | | | | ESN 2 | | | | |
|---|---|---|---|---|---|---|---|---|---|---|---|---|
| | | | START | END | ORIGIN | DESTINATION | | START | END | ORIGIN | DESTINATION |
| 1 | A | FULL FLIGHT | 8/1/2023 12:00 | 8/1/2023 14:00 | N/A | N/A | | 8/1/2023 12:00 | 8/1/2023 14:00 | N/A | N/A |
| 2 | A | TAKE OFF | 8/1/2023 12:15 | 8/1/2023 13:30 | BOS | SEA | | 8/1/2023 12:15 | 8/1/2023 12:20 | BOS | SEA |
| 3 | A | CRUISE | 8/1/2023 12:45 | 8/1/2023 13:45 | BOS | SEA | | 8/1/2023 12:45 | 8/1/2023 12:50 | BOS | N/A |

FIG.5B

| No. | FLIGHT OBJECT | REPORT | ESN 1 | | | | | ESN 2 | | | | |
|---|---|---|---|---|---|---|---|---|---|---|---|---|
| | | | START | END | ORIGIN | DESTINATION | | START | END | ORIGIN | DESTINATION |
| 1 | A | TAKE OFF | 8/1/2023 12:00 | 8/1/2023 12:05 | N/A | N/A | | 8/1/2023 12:00 | 8/1/2023 12:05 | N/A | N/A |
| 2 | B | FULL FLIGHT | 8/1/2023 13:30 | 8/1/2023 14:00 | N/A | N/A | | 8/1/2023 12:00 | 8/1/2023 15:00 | N/A | N/A |
| 3 | B | CRUISE | 8/1/2023 13:45 | 8/1/2023 13:50 | N/A | N/A | | 8/1/2023 13:45 | 8/1/2023 13:50 | N/A | N/A |

FIG.5C

| No. | FLIGHT OBJECT | REPORT | ESN 1 | | | | | ESN 2 | | | | |
|---|---|---|---|---|---|---|---|---|---|---|---|---|
| | | | START | END | ORIGIN | DESTINATION | | START | END | ORIGIN | DESTINATION |
| 1 | A | FULL FLIGHT 1 | 8/1/2023 12:00 | 8/1/2023 14:00 | N/A | N/A | | | | | |
| 2 | A | FULL FLIGHT 1 | | | | | | 8/1/2023 12:00 | 8/1/2023 14:00 | N/A | N/A |
| 3 | A | TAKE OFF | 8/1/2023 12:15 | 8/1/2023 12:20 | BOS | SEA | | 8/1/2023 12:15 | 8/1/2023 12:20 | BOS | SEA |
| 4 | A | CRUISE | 8/1/2023 12:45 | 8/1/2023 12:50 | BOS | SEA | | 8/1/2023 12:45 | 8/1/2023 12:50 | BOS | N/A |

FIG.5D

| No. | FLIGHT OBJECT | REPORT | ESN 1 | | | | | ESN 2 | | | | |
|---|---|---|---|---|---|---|---|---|---|---|---|---|
| | | | START | END | ORIGIN | DESTINATION | | START | END | ORIGIN | DESTINATION |
| 1 | A | FULL FLIGHT | 8/1/2023 12:00 | 8/1/2023 14:00 | N/A | N/A | | | | | |
| 2 | A | TAKE OFF | 8/1/2023 12:15 | 8/1/2023 12:20 | BOS | SEA | | 8/1/2023 12:15 | 8/1/2023 12:20 | BOS | SEA |
| 3 | A | CRUISE | 8/1/2023 12:45 | 8/1/2023 12:50 | BOS | SEA | | 8/1/2023 12:45 | 8/1/2023 12:50 | BOS | N/A |

| FLIGHT COUNT | SNAPSHOT 1 | SNAPSHOT 2 | FULL FLIGHT 1 | FULL FLIGHT 2 | FLIGHT PATH | ENGINE MAINTENANCE |
|---|---|---|---|---|---|---|
| 1 | INCLUDED | INCLUDED | INCLUDED | INCLUDED | INCLUDED | EXCLUDED |
| 2 | EXCLUDED | EXCLUDED | INCLUDED | INCLUDED | INCLUDED | EXCLUDED |
| 3 | INCLUDED | INCLUDED | EXCLUDED | EXCLUDED | INCLUDED | EXCLUDED |
| 4 | EXCLUDED | EXCLUDED | EXCLUDED | INCLUDED | EXCLUDED | INCLUDED |

FIG.6

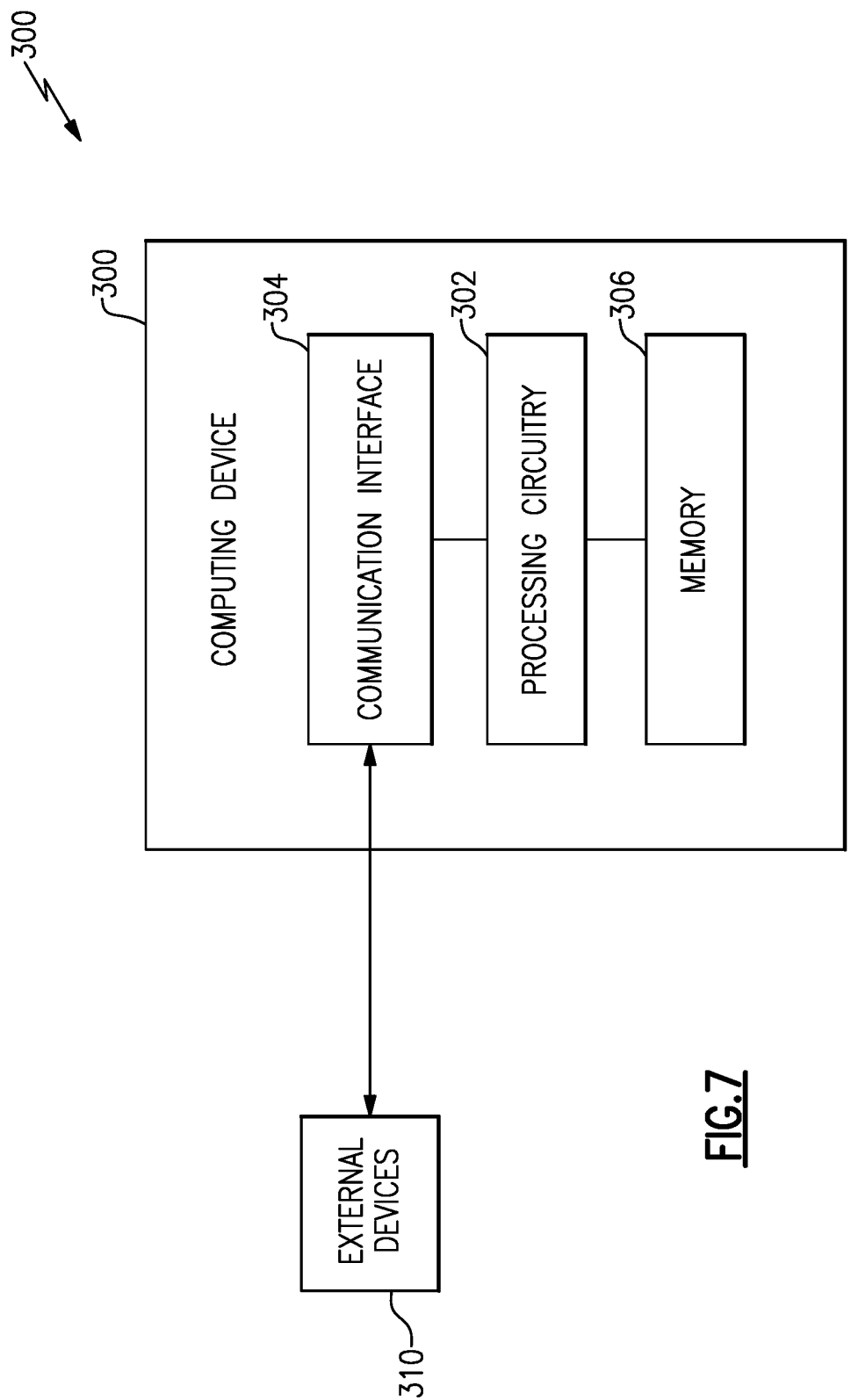

FLIGHT-RELATED DATA MANAGEMENT SYSTEM

BACKGROUND

This application relates to data management, and more particularly to a data management system for correlating and providing access to a plurality of different flight-related data sets.

Flight-related data (e.g., describing gas turbine engine operation and flight conditions) is valuable for performing analytics and engine health monitoring of a gas turbine engine. However, such data is often received asynchronously, potentially out of order, and utilizing a plurality of different schemas and formats. For example, the data may be provided at different intervals, and may come from a variety of different on-board avionic systems and even from third party sources.

Historically, each individual source of data has been dealt with independently, which has required separate data ingestion architectures and analytic platforms. Due to the varying structure of the data from each source, each storage solution has technical limitations that may not be optimal or compatible with data from another source. As a result, several reports generated from the same flight/event are likely to be scattered across multiple data storage systems, with different systems potentially favored by different business units.

After data is ingested, an analyst manually cross reference resources to produce a coherent perspective of an event or anomaly. This introduces challenges with usage-based life analysis, which aims to monitor the degradation of system components over the system's life span. Each data source may also have dropout challenges where a report may be available from one source but not the other, and vice versa. As a result, engine life algorithms cannot reliably subscribe to a single source of data to determine an accurate trend of usage.

SUMMARY

A method of providing access to flight-related data of aircraft according to an example embodiment of the present disclosure includes correlating a plurality of data sets that are different from each other and each contain flight-related data for one or more aircraft engines, to determine a plurality of flights of the one or more aircraft engines that correspond to the plurality of data sets. At least a portion of the flight-related data describes operation of the aircraft engines during the plurality of flights. The correlating is performed based on metadata of the plurality of data sets, and the plurality of data sets includes a plurality of first data sets that utilize a plurality of different schemas. The method also includes creating, for each of the plurality of flights and based on the correlating, a respective flight object that represents the flight and includes a plurality of discrete flight data objects that each correspond to a respective one of the plurality of data sets for the flight. The flight object for one of the flights is utilized to provide access to one or more of the data sets for the one of the flights.

In a further embodiment of the foregoing embodiment, the plurality of data sets also includes a plurality of second data sets that utilize one or more data formats that are different from one or more data formats of the plurality of first data sets.

In a further embodiment of any of the foregoing embodiments, the metadata that the correlating is performed based on includes serial numbers of the aircraft engines, and includes at least one of flight origins, flight destinations, and timestamps for the flights.

In a further embodiment of any of the foregoing embodiments, the method also includes providing a search engine for accessing the plurality of data sets based on the flight objects, wherein utilizing the flight object is performed in response to a request to the search engine that identifies the one of the flights or one of the aircraft.

In a further embodiment of any of the foregoing embodiments, each flight data object describes the content and location of its corresponding data set.

In a further embodiment of any of the foregoing embodiments, the plurality of data sets includes a plurality of snapshot data sets corresponding to discrete events or portions of the plurality of flights, and a plurality of full flight data sets that include data for entire ones of the plurality of flights.

In a further embodiment of any of the foregoing embodiments, each flight object includes a flight data object for at least one snapshot data set and a flight data object for at least one full flight data set.

In a further embodiment of any of the foregoing embodiments, the correlating includes determining that a particular snapshot data set and a particular full flight data set that each identify a same aircraft engine both correspond to a particular flight of the plurality of flights for the aircraft engine based on a timestamp of the particular snapshot data set being between a start time and end time for the particular full flight data set.

In a further embodiment of any of the foregoing embodiments, the correlating includes determining that a first snapshot data set and a second snapshot data set that each identify a same aircraft engine both correspond to a particular flight of the plurality of flights based on: the first snapshot data set corresponding to a first event or first portion of the particular flight and occurring at a first time, and the second snapshot data set corresponding to a second event or second portion of the particular flight and occurring at a second time that is within an expected time window for the second event or second portion after the first event or first portion.

In a further embodiment of any of the foregoing embodiments, the plurality of first data sets are from a plurality of different sources, and different ones of the schemas correspond to different ones of the sources.

In a further embodiment of any of the foregoing embodiments, the utilizing the flight object for one of the flights to provide access to one or more of the data sets for the one of the flights includes: determining a subset of the plurality of the datasets that correspond to a particular flight; performing analytics for the particular flight based on the determined subset of the plurality of data sets; and linking results of the analytics for the flight with the flight object for the flight.

A system for aircraft data management according to an example embodiment of the present disclosure includes processing circuitry operatively connected to memory and configured to correlate a plurality of data sets that are different from each other and each contain flight-related data for one or more aircraft engines, to determine a plurality of flights of the one or more aircraft engines that correspond to the plurality of data sets. At least a portion of the flight-related data describes operation of the aircraft engines during the plurality of flights. The correlation is performed based on metadata of the plurality of data sets, and the plurality of data sets includes a plurality of first data sets that utilize a plurality of different schemas. The processing circuitry is also configured to create, for each of the plurality of flights and based on the correlating, a respective flight object that represents the flight and includes a plurality of discrete flight data objects that each correspond to a respective one of the plurality of data sets for the flight; and utilize the flight object for one of the flights to provide access to one or more of the data sets for the one of the flights.

In a further embodiment of the foregoing embodiment, the plurality of data sets also includes a plurality of second data sets that utilize one or more data formats that are different from one or more data formats of the plurality of first data sets.

In a further embodiment of any of the foregoing embodiments, the metadata that the correlation is based on includes serial numbers of the aircraft engines, and includes at least one of flight origins, flight destinations, and timestamps for the flights.

In a further embodiment of any of the foregoing embodiments, each flight data object describes the content and location of its corresponding data set.

In a further embodiment of any of the foregoing embodiments, the plurality of data sets includes a plurality of snapshot data sets corresponding discrete events or portions of the plurality of flights, and includes a plurality of full flight data sets that include data from flight recorders for entire ones of the plurality of flights.

In a further embodiment of any of the foregoing embodiments, as part of the correlation, the processing circuitry is configured to determine that a particular snapshot data set and a particular full flight data set that each identify a same engine both correspond to a particular flight of the plurality of flights for the engine based on a timestamp of the particular snapshot data set being between a start time and end time for the particular full flight data set.

In a further embodiment of any of the foregoing embodiments, as part of the correlation, the processing circuitry is configured to determine that a first snapshot data set and a second snapshot data set that each identify a same engine both correspond to a particular flight of the plurality of flights based on: the first snapshot data set corresponding to a first event or first portion of the particular flight and occurring at a first time; and the second snapshot data set corresponding to a second event or second portion of the particular flight and occurring at a second time that is within an expected time window for the second event or second portion after the first event or first portion.

In a further embodiment of any of the foregoing embodiments, the plurality of first data sets are from a plurality of different sources, and different ones of the schemas correspond to different ones of the sources.

In a further embodiment of any of the foregoing embodiments, as part of the utilization of the flight object for one of the flights to provide access to one or more of the data sets for the one of the flights, the processing circuitry is configured to: determine a subset of the plurality of the datasets that correspond to a particular flight; perform analytics for the particular flight based on the determined subset of the plurality of data sets; and link results of the analytics for the flight with the flight object for the flight.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

FIGS. 5A-D schematically a plurality of examples of correlation of data sets.

FIG. 6 schematically illustrates the availability of a plurality of data sets for a plurality of flights FIG. 7 schematically illustrates an example computing device that may be used in the data management system of FIG. 1.

DETAILED DESCRIPTION

Figure 1:
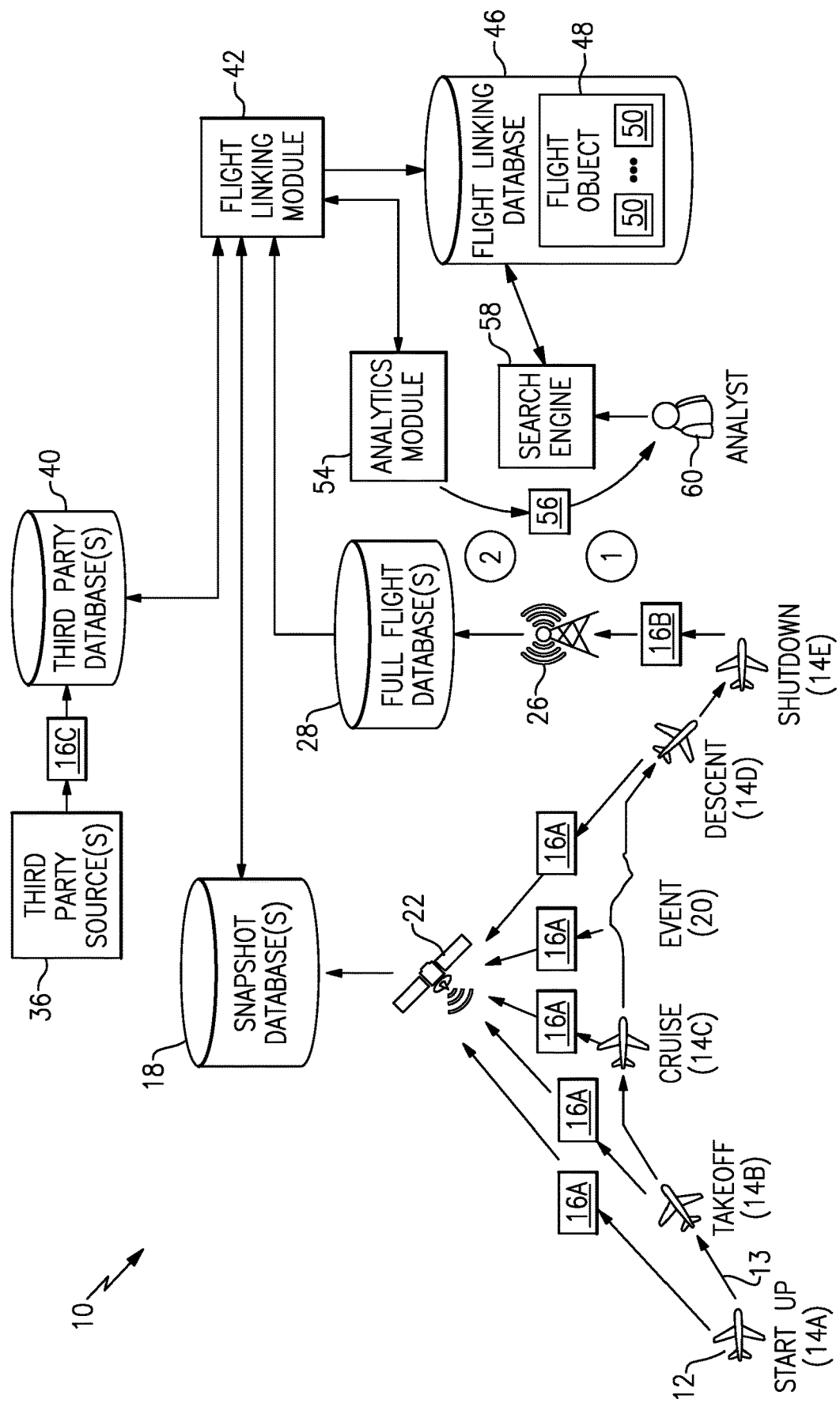
FIG. 1 schematically illustrates an example data management system.

FIG. 1 schematically illustrates an example data management system 10 for correlating and providing access to a plurality of different flight-related data sets 16A-C that, in addition to including different values, have different schemas (e.g., different numbers of fields, different field lengths, different parameters, different parameter names potentially for the same parameter, etc.). The data sets may be captured at different sampling rates and may contain different data quality (e.g., packets may be lost when transmitting through Wi-Fi vs cellular and a parameter has "NaN" in one data set while another does not).

The data sets can be categorized into the following general formats:
  Structured Data—Refers to data with a known schema that can be stored in a tabular solution such as a relational database.
  Semi-structured Data—Refers to data with a known schema that cannot be stored in a tabular solution. This data is commonly referred to as NoSQL formatted data and can be thought of as a nest JSON object or XML object, for example.
  Unstructured Data—Refers to data stored in a file located in an object storage solution such as Microsoft's Azure Blob storage, Amazon Web Services (AWS) S3, or a desktop folder, for example. The content of the file can be any standardized formats such as CSV, Apache Parquet, TXT, or a proprietary encoded storage format like an encoded report off boarded directly from an aircraft's memory system or the output of an offboard proprietary engine model. Unstructured data is open ended for what it could contain. The binary format of the data could make it impossible for storage in some standard analysis technology. Here are some potential examples: a text file summarizing maintenance events or other notes from the operator regarding an engine, images captured from borescope inspection, audio recording of calls regarding flight events. Unstructured data may have a schema (e.g., a CSV file with defined fields), or may lack a schema (e.g., image files, audio files, PDF files).

In one or more examples, the plurality of data sets 16 includes a plurality of first data sets 16 that are text and/or numeral based and that utilize a plurality of different schemas, and also includes a plurality of second data sets that lack a schema and utilize one or more data formats (e.g., image files, audio files, PDF files) that are different from one or more data formats of the plurality of first data sets 16. Although FIG. 1 focuses on a single aircraft 12 and a single flight 13 for illustrative purposes, it is understood that the data management system 10 can handle and correlate data sets for many flights and many aircraft 12.

The data sets include "snapshot" data sets 16A that correspond to discrete flight events and/or flight portions (e.g., aircraft liftoff/takeoff, aircraft descent, ground, vibration/temperature exceedances, abnormal engine starts, unexpected engine shutdowns, a stuck actuator, abnormal fuel consumption, and/or other onboard diagnostic analyses) of the flight 13, and also include at least one full flight data set that includes data for the entire flight 13. Each snapshot data set 16A and each full flight data set 16B may be structured, semi-structured, or unstructured.

As shown in FIG. 1, the aircraft 12 engages in the flight 13 that includes a plurality of stages 14A-E, including startup (14A), takeoff (14B), cruise (14C), descent (14D), and shutdown (14E). During the flight 13 and for each of the stages 14A-D, a corresponding snapshot data set 16A is recorded and uploaded to one or more snapshot databases 18. A snapshot data set 16A is also uploaded based on occurrence of a flight event 20 (e.g., a stuck actuator). Although only one such flight event 20 is depicted, it is understood that multiple flight events 20 may occur that each trigger their own respective snapshot data report 16A. While the aircraft 12 is in flight, the snapshot data sets 16A are uploaded via a satellite-based network connection 22.

After landing, and in conjunction with the shutdown event 14E, one or more full flight data sets 16B, which each include data for an entire flight, are uploaded via a network connection 26 (e.g., WiFi or cellular-based connection) to one or more full flight databases 28. The full flight data set 16B may include data obtained, or derived from, a flight recorder. Although potentially transmitted sequentially, the various snapshot data sets 16A and full flight data set 16B may nevertheless arrive out of order.

The data sets 16A-B all include sensor data and include metadata. Some example types of sensor data that may be included are: spool speeds of a gas turbine engine (GTE) of the aircraft 12, fuel flow of the GTE, temperatures/pressures across different stages in the GTE, actuator positions of the GTE or aircraft 12 in general, airflow bleed configurations for mass flow to a cabin of the aircraft 12, oil filter delta pressure of the GTE, component vibrations of the GTE, etc. Some additional examples include command signals from aa cockpit of the aircraft 12, and engine control logic of the GTE, such as requested fuel flow and pilot throttle lever angle (which indicates requested thrust). As used herein, metadata refers to any data that is not aircraft sensor data (e.g., engine serial number, airline identifier, flight origin, flight departure time, and/or flight destination).

One or more third party data sources 36 may also provide one or more third data sets 16C to one or more third party databases 40. The third party data sets 16C are flight-related but may not include any aircraft sensor data. The third party data sets may be obtained from other businesses providing data, or data found on the open Internet. For example, the third party data sources 36 may include a third party aircraft tracking service that provides data about flight paths of a plurality of flights (e.g., FlightAware®, which provides commercial and non-commercial flight tracking services, and provides information such as flight path, arrival time, departure time, and real-time position information for various flights based on aircraft tail number). Another example third party data source is NASA, which provides information about flight conditions, such as atmospheric air quality around the world over time. Atmospheric air quality data may be used in analytics for modeling the physics of the combustor and cooling in the turbine of the GTE. Knowing the quality of air the aircraft 12 flies through, one can model the efficiency of the combustion process and estimate the internal temperatures of combustor walls of the GTE. In the turbine section of the GTE, one can use the air composition to model cooling properties in the hot section of the GTE, for example. In one or more examples, a third party data set may be received from a different business unit (e.g., an API for getting more detailed sensor data for the oil system or environment control system for the cabin of the aircraft 12). It is understood that even though use of the third party data sources 36 is discussed in connection with FIG. 1, use of the third party data sources 36 is optional, and they may be omitted.

A flight linking module 42 accesses the snapshot database (s) 18, full flight database(s), and optionally also third party database(s) 40 to correlate the plurality of data sets 16A-C with the particular flight 13 of the aircraft 12, and creates a flight object 48 that represents the flight 13. The flight linking module 42 performs the correlating at least in part on the metadata (as discussed in greater detail below).

The flight object 48 includes a plurality of discrete flight data objects 50 that each correspond to one of the data sets 16A-C, and each store at least metadata of their corresponding data set. In one or more examples, the metadata describes the content and location of the data set 16, and allows the flight data object 50 to serve as a link back to where the corresponding data set is stored, to avoid unnecessary duplication of the data set. The metadata may include any one or more of the following for example: location of corresponding data set 16A-C, parameter names, sampling interval, recording start time, recording end time, associated asset IDs like aircraft and engine serial numbers, airline that conducted the flight 13, origin/destination for the flight 13, software version installed on the GTE, hardware that is installed on the GTE, flight phase that the report captures, etc.

Herein, reference numeral 16 is generically used to refer to the data sets 16A-C. In one or more examples, after all data sets 16 have been received, the plurality of data sets for each flight object 48 include at least one snapshot data set 16A and at least one full flight data set 16B.

An analytics module 54 performs analytics for the flight 13 based on the plurality of data sets 16A-C for the flight 13, and links results of the analytics for the flight 13 with the flight object 48 for the flight 13. The analytics module 54 may also provide one or more notifications 56 (e.g., to an analyst 60) for a variety of reasons, such as occurrence of flight events that are of interest to analysts and/or the occurrence of data quality issues. The analyst 60 may be responsible for engine health and monitoring analysis, for example. Some examples of flight events that may be of interest may include fault detection or abnormal operations. Data quality issues that may trigger notifications may include missing parameters, random jumps of time in the recording, existing parameters with nonsense values, etc.

The data management system 10 includes a search engine 58 for accessing the plurality of data sets 16 based on the flight objects 48, and that utilizes the flight object 48 of the flight 13, and flight objects of numerous other flights, to provide access to the data sets 16A-C for the flights. As used herein, "providing access" could mean actually including the data set 16 as part of the flight object 48 and/or providing information on how to access the data set 16 (e.g., a URL or URI of where the data set 16 can be downloaded).

Figure 2:
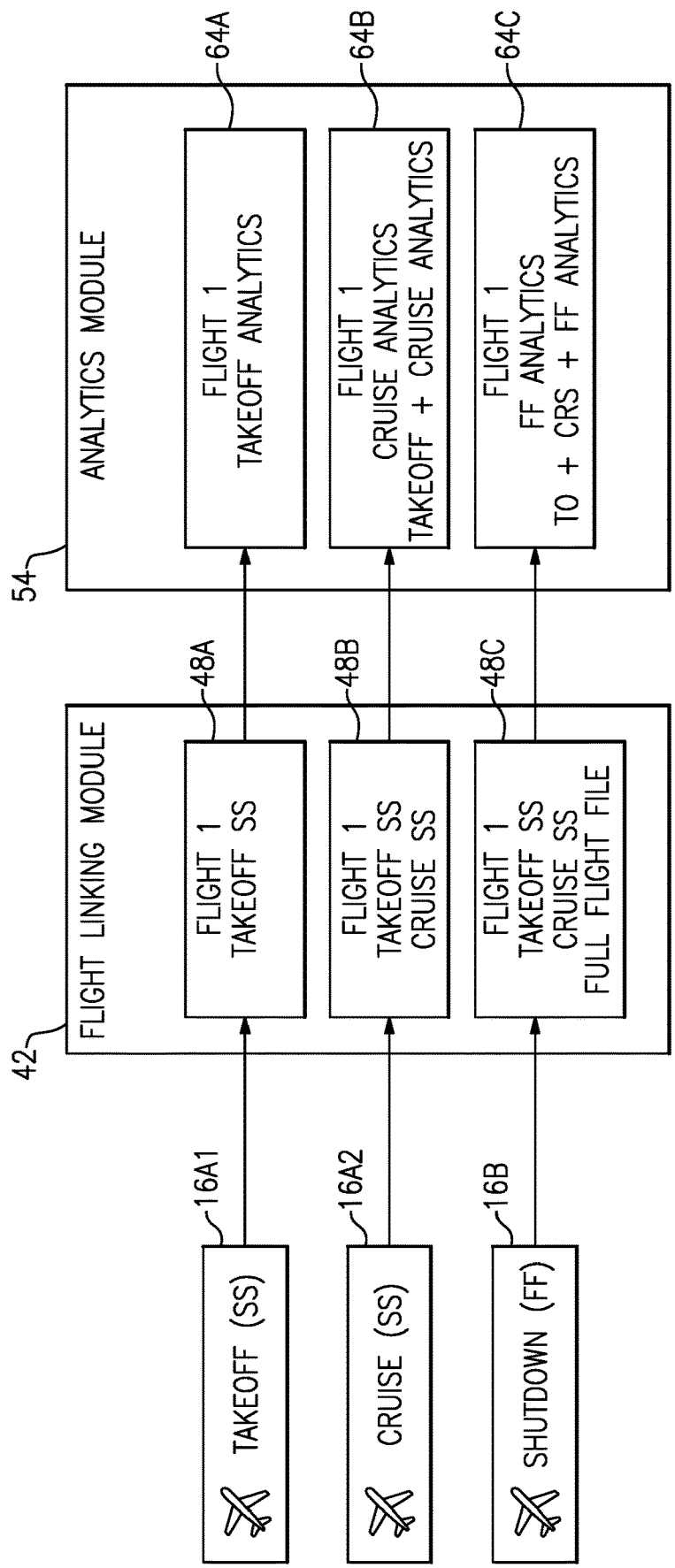
FIG. 2 schematically illustrates an example of how data sets are linked and analyzed in the system of FIG. 1.

FIG. 2 schematically illustrates an example of how data sets may be collected, linked, and analyzed in the system of FIG. 1. As the aircraft 12 takes off, a takeoff snapshot data set 16A1 is transmitted to and received by the data management system 10, and the flight linking module 42 creates a flight object 48A that is a first version of the flight object 48 of FIG. 1, and initially only includes the snapshot data set 16A1. The analytics module 54 performs initial analytics on the data in the flight object 48A (shown at step 64A).

Shortly thereafter, when the aircraft 12 enters cruise, a cruise snapshot data set 16A2 is transmitted to and received by the data management system 10, and the flight linking module 42 updates the flight model 48A to obtain an updated flight model 48B, which includes both snapshot data sets 16A1, 16A2, and the analytics module 54 performs additional analytics on the data in the flight object 48B, which are based on both data sets 16A1, 16A2 (shown at step 64B). The update may occur in real-time or near real-time, for example.

Subsequently, a shutdown full flight data set 16B is transmitted to and received by the data management system, and the flight linking module 42 updates the flight model 48B to obtain an updated flight model 48C which includes both snapshot data sets 16A1, 16A2 and the full flight data set 16B, and the analytics module 54 performs additional analytics on the data in the flight object 48C, which are based on all three data sets 16A1, 16A2, 16B (shown at step 64C).

The analytics module 54 may perform stateless analytics, which are performed for discrete flights, and/or may perform trending analytics, which are performed for data of an aircraft across a plurality of flights. Stateless analytics may be used, e.g., to detect parameter exceedances and event detection, using environment conditions and control inputs to feed a physics model that determines the expected performance of the engine under these conditions. Trending analytics looks across multiple flights for an aircraft (e.g., fuel consumption) and may, e.g., count the number of exceedances the engine had over the last 5 flights, which may be used to determine if over the last 15 flights an exponential deviation from the physics model is occurring, or may be used to determine something such as fuel consumption of the flights.

Figure 3:
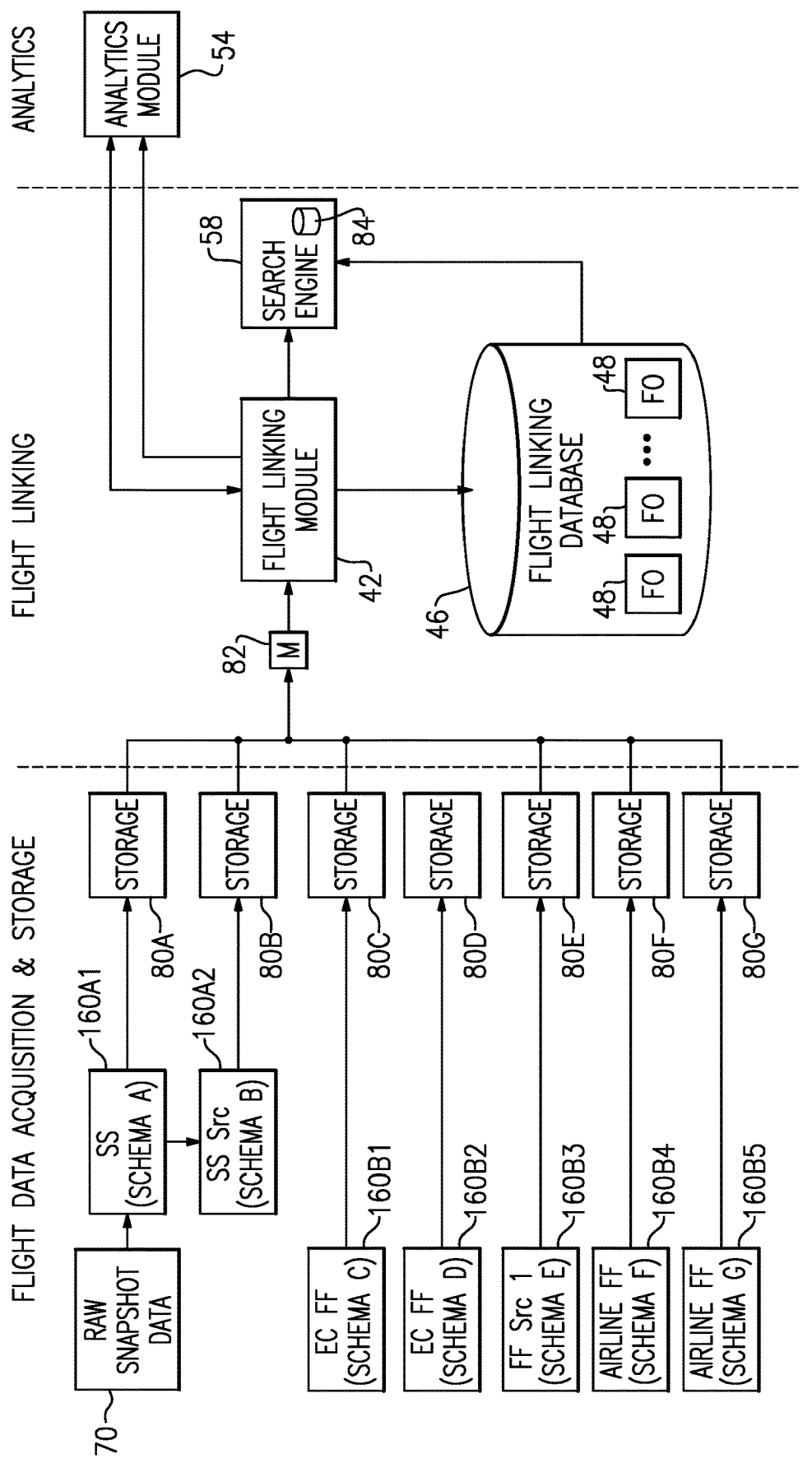
FIG. 3 schematically illustrates an example implementation of the data management system of FIG. 1.

FIG. 3 schematically illustrates an example implementation of the data management system 10 of FIG. 1. In FIG. 3, reference numeral 160 will be used to refer to the various data sets (as opposed to using numeral 16 as in FIG. 1). Raw snapshot data 70 is used to provide at least one snapshot data set 160A1, which has a first schema A, and which is saved in electronic storage 80A.

An additional snapshot data set 160A2, which is derived from data set 160A1, and which has a second schema B, is obtained and saved in electronic storage 80B.

A plurality of full flight data sets 160AB1-160B5 are also obtained, which each have different respective schemas. These include the following:

full flight data set 160B1 uses schema C and is stored in storage 80C;
full flight data set 160B2 uses schema D, and is stored in electronic storage 80D;
full flight data set 160B3 uses schema E and is stored in electronic storage 80E;
full flight data set 160B4 uses schema F and is stored in electronic storage 80F;
full flight data set 160B5 uses schema G and is stored in electronic storage 80G.

Full flight data sets 160B1-2 are from an engine company ("EC") that manufactures an engine of the aircraft 12 being monitored. Full flight data sets 160B4-5 are from one or more airlines that utilize the aircraft 12.

Metadata 82 from the various data sets 160 is published to the flight linking database 46. The search engine 58 effectively sits on top of the flight linking database 46 for exploring the data of the various flight objects 48.

The storages 80A-G may correspond to a plurality of different servers run by a plurality of different service providers (e.g., run internally by the engine company "EC" referenced above, or run by one or more general cloud-based hosting services). The servers 80A-G may be configured to optimally store one structure of data vs another (e.g., NoSQL, SQL, graph databases, general file storage, or other API endpoints).

Figure 4:
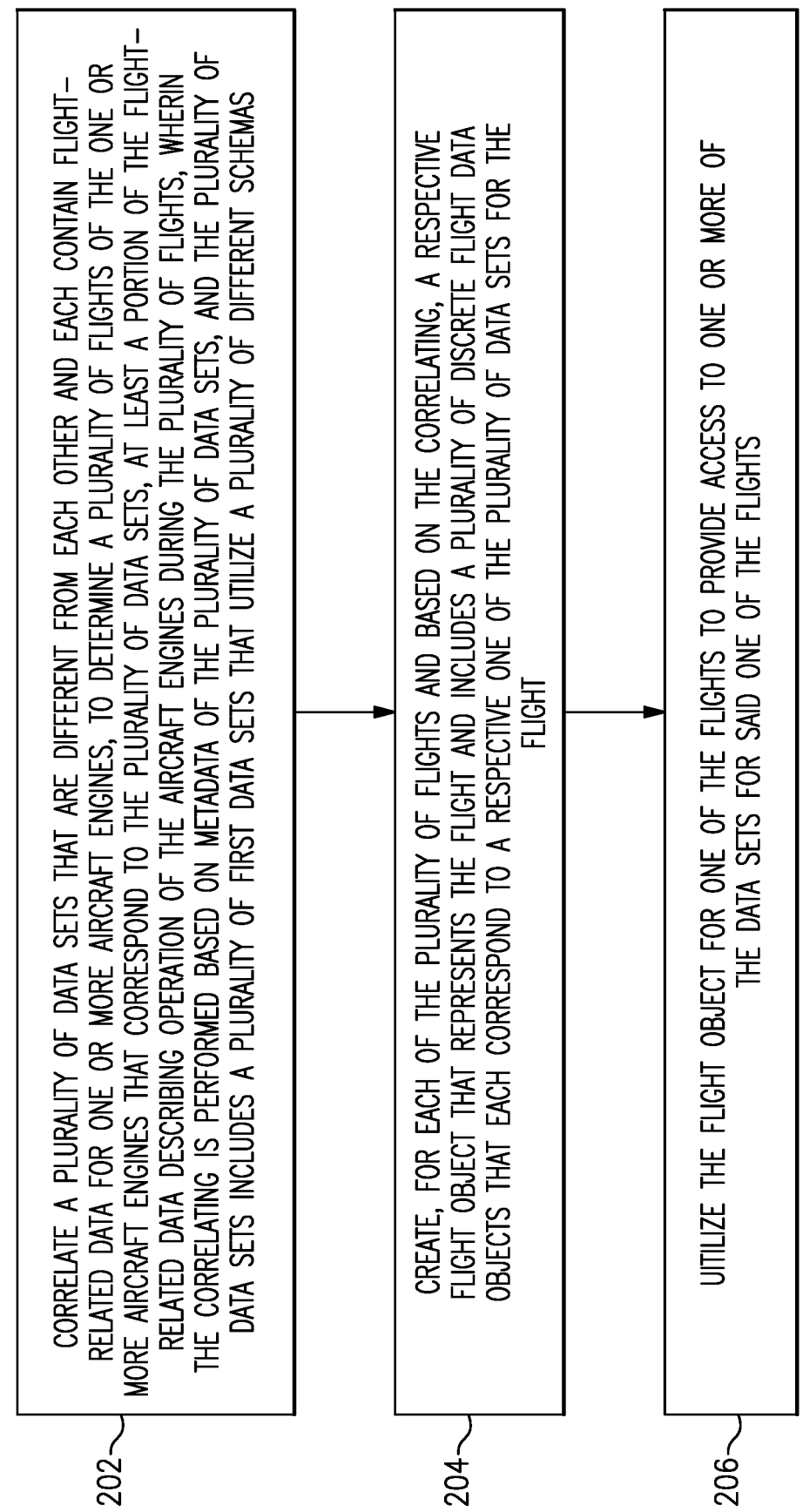
FIG. 4 is a flowchart of an example method of providing access to flight-related data of aircraft.

FIG. 4 is a flowchart of an example method 200 of providing access to flight-related data of aircraft. A plurality of data sets that are different from each other and each contain flight-related data for one or more aircraft engines, are correlated to determine a plurality of flights of the one or more aircraft engines that correspond to the plurality of data sets, (step 202). At least a portion of the flight-related data describe operation of the aircraft engines during the plurality of flights (i.e., some of the flight-related data may simply list a departure time or departure city that do not describe aircraft engine operation). The correlating of step 202 is performed based on metadata of the plurality of data sets 16, and the plurality of data sets 16 includes a plurality of first data sets that utilize a plurality of different schemas. In one or more examples, the plurality of first data sets 16 are from a plurality of different sources (e.g., as shown in FIG. 3), and different ones of the schemas correspond to different ones of the sources.

For each of the plurality of flights 13, and based on the correlating of step 202, a respective flight object 48 is created that represents the flight 13 and includes a plurality of discrete flight data objects 50 that each correspond to a respective one of the plurality of data sets for the flight 13 (step 204).

The flight object 48 for one of the flights is utilized to provide access to one or more of the data sets for said one of the flights (step 206).

In one or more examples, the plurality of data sets 16 also includes a plurality of second data sets that utilize one or more data formats (e.g., images, audio files, PDFs, etc.). that are different from one or more data formats of the plurality of first data sets 16.

In one or more examples, the metadata that the correlating of step 202 is performed based on includes serial numbers of the aircraft engines, and includes at least one of flight origins, flight destinations, and timestamps for the flights 13.

In one or more examples, the search engine 58 is provided for accessing the plurality of data sets 16 based on the flight objects 48, and the search engine 58, based on a request identifying one of the flights, utilizes the flight objects 48 for said one of the flights to provide access to each of the data sets 16 for said one of the flights 13.

In one or more examples, each flight object 48 includes a flight data object 50 for at least one snapshot data set 16A and a flight data object 50 for at least one full flight data set 16B.

In one or more examples, each of the flight objects 48 represents data for a single engine of a single one an aircraft for a single flight 13. Under this example configuration, an aircraft having two engines would have two flight objects, one corresponding to each engine.

In one or more examples, the method includes utilizing the flight object 48 for a particular flight to identify a subset of the plurality of data sets 16 that correspond to the particular flight, performing analytics for the particular flight based on the utilizing, and, linking results of the analytics for the flight with the flight object for the flight.

In one or more example, the correlating of step 202 includes determining that a particular snapshot data set 16A and a particular full flight data set 16B that each identify a same aircraft engine both correspond to a particular flight of the plurality of flights for the aircraft engine based on a timestamp of the particular snapshot data set being between a start time and end time for the particular full flight data.

In one or more example, the correlating of step 202 includes determining that a first snapshot data set and a second snapshot data set that each identify a same aircraft engine both correspond to a particular flight of the plurality of flights based on: the first snapshot data set corresponding to a first event or first portion of the particular flight and occurring at a first time (e.g., takeoff), and the second snapshot data set corresponding to a second event or second portion of the particular flight (e.g., cruise) and occurring at a second time that is within an expected time window for the second event or second portion after the first event or first portion (e.g., an expected time for cruise to happen after takeoff).

FIGS. 5A-D schematically a plurality of examples of how step 202 may be performed to correlate data sets 16, even without having flight identifiers. In these figures, "ESN 1" and "ESN 2" refer to a pair of "cross wing" gas turbine engines used on opposing sides of an aircraft.

FIG. 5A illustrates a first example that includes three pairs of data sets, shown in rows 1, 2, and 3. The first pair (row 1), full flight data sets for ESN 1 and ESN 2, which both lack and origin and destination, are received and a flight object A is created. The second pair (row 2) is a pair of takeoff snapshot data sets that each include an origin of "BOS" and a destination of "SEA". The third pair (row 3) is a pair of cruise snapshot data sets that each include an origin of BOS" and a destination of "SEA." Because the timestamp of the takeoff and cruise data sets of rows 1-2 are within the duration of the full flight data set of row 1, the takeoff and cruise data sets are assigned to the same flight object as the first row. Also, despite the snapshot data sets of rows 2-3 arriving after the full flight data set of row 1 (and therefore being received out of order, as in at least some examples it is expected that snapshot data sets for a flight would be received before a full flight data set for the flight), the data management system 10 is able to effectively correlate the various data sets.

FIG. 5B illustrates a second example that includes three pairs of data sets, shown in rows 1, 2, and 3. In this example, all of the data sets lack origin and destination information. The takeoff data sets of row 1 fall outside time window of the full flight data set of row 2, and so rows 1 and 2 are assigned to different flight objects. The cruise data set (row 3) falls within the time window of the full flight data set of row 2, and so the data sets of rows 2 and 3 are assigned to the same flight object.

FIG. 5C illustrates a third example that includes two pairs of cross wing snapshot data sets (rows 3 and 4) and two full flight data sets without a cross wing relationship shown in rows 1 and 2. Because the cross wing relationship is apparent from the data sets of rows 3 and 4, it can be inferred for the data sets of rows 1 and 2. Also, because the takeoff data sets (row 3) and cruise data sets (row 4) occur within a time window of the full flight data sets of rows 1 and 2, each of the data sets in FIG. 5C are assigned to the same flight object.

FIG. 5D illustrates a fourth example that includes two pairs of cross wing snapshot data sets (rows 2 and 3) and a full flight data set for ESN 1 (row 1). A full flight dataset for ESN 2 is not available. Because the takeoff data sets (row 2) and cruise data sets (row 3) occur within a time window of the full flight data set (row 1), it is clear that at least the ESN 1 data sets of rows 2 and 3 and full flight data set for ESN 1 from row 1 can be assigned to a single flight object. Also, because the cross wing relationship between the data sets of rows 2 and 3 is known, the ESN 2 data sets of rows 2 and 3 can also be assigned to the same flight object.

FIG. 6 schematically illustrates the availability of a plurality of data sets for a plurality of flights 13-1, 13-2, 13-3, and 13-4. The data sets for each flight 13 include snapshot data sets 16A-1 and 16A-2, full flight data sets 16B-1 and 16B-2, flight path data set 16D, and engine maintenance data set 16E. These will be discussed in more detail below.

Suppose analyst 60 wants to create an off board analytic that monitors for when an engine's combustor temperature (T4) exceeds a lower threshold (LIM) configured on the onboard redline limit. Suppose further that in this example, when the analytics module 54 detects T4>LIM across any of the data sets 16, a notification should be provided to a field support team so they may advise airlines how to mitigate deterioration and avoid higher exceedances. Further suppose that aircraft 12 has installed an onboard communication system that is configured to send two types of snapshot data (16A-1 and 16A-2) and two types of full-flight data (16B-1 and 16B-2), where:

Snapshot data set 16A-1:
- is a semi-structured report that records the value of T4 and altitude (ALT) at the moment T4 is at its peak value during takeoff and climb of the aircraft 12;
- is transmitted to a ground station after the aircraft 12 has entered a stable cruise; and
- is stored in a NoSQL database.

Snapshot data set 16A-2:
- is a semi-structured report that captures a 5 second recording with a sampling rate of 1 hz at the time where T4 is at its peak while the aircraft 12 is stably cruising;
- is transmitted to the ground station when the aircraft 12 begins to descend; and
- is stored in a NoSQL database.

Full flight data set 16B-1:
- is a unstructured report that records T4 for the entire duration of the flight at a sampling frequency of 5 hz;
- is transmitted to the ground station only through WiFi when the engine shuts down; and
- is stored as a parquet file in a S3 bucket.

Full flight data set 16B-2:
- is a structured report that records the exhaust gas temperature (T5) for the entire duration of the flight at 1 hz;
- is transmitted to the ground station through WiFi or cellular connection when the engine shuts down; and
- is stored in a relational database.

Supplemental data sets 16D and 16E are from third parties and include the following:

Flight path information data set 16D:
- is a structured report that records ALT, Longitude (LON), Latitude (LAT), Air Quality Factor (AQF) for the entire duration of the flight; and
- is available through a REST API after the flight is completed.

Engine maintenance data set 16E:
- is a semi-structured report that includes a record count of when service is performed on the engine to improve performance and mitigate scenarios where T4>LIM; and
- is stored in a NoSQL Database.

Consider an example progression of engine usage and received data sets from each flight as described below.

Flight 13-1: Coverage includes all snapshot and full flight data (16A-1, 16A-2, 16B-1, 16B-2) as well as the flight path (16D). Give that "full flight 1" data set 16B-1 was received, the T4 value can be used as the input to the analytics module 54 to evaluate the highest sampling rate available for this parameter during the flight 13. With the flight path data available, the peak T4 value can be correlated with the location of the aircraft 12 to correct the T4 value with respect to the environment conditions. No engine maintenance has been performed on the engine (so flight maintenance data set 16E is not received).

Flight 13-2: Coverage includes full flight data (16B-1 and 16B-2) and the flight path 16D. Give that full flight 1 (16B-1) was received, the T4 value can be used as the input to the analytics module 54 to evaluate the high sampling rate available for this parameter, even though the snapshot reports 16A-1 and 16A-2 are missing. With the flight path data available, the peak T4 value can be correlated with the location of the plane to correct the T4 value with respect to the environment conditions. No engine maintenance has been performed on the engine (so flight maintenance data set 16E is not received).

Flight 13-3: Here the coverage includes the two snapshot reports 16A-1 and 16A-2 and the flight path data set 16D, but not full flight data sets 16B-1 or 16B-2. Both snapshot reports 16A-1 and 16A-2 can be audited for T4 value exceedances, and can then be correlated to the flight path data set 16D to correct the T4 value with respect to environment conditions. No engine maintenance has been performed on the engine (so flight maintenance data set 16E is not received). A condition where T4>LIM was found in snapshot data set 16A-1 (which may be a takeoff report), and a notification is delivered to the field support team, and guidance is provided to engine operators.

Flight 13-4: The only full flight data set that is received is "full flight 2" (16B-2), and engine maintenance was performed, so engine maintenance data set 16E is received. This "flight" may be a ground run after maintenance was conducted in response to the field support notification. During this ground run flight, the aircraft was briefly turned on and did not take off, thus not transmitting any snapshot data. While testing, the aircraft 12 was not able to connect to Wi-Fi, so the "full flight 1" data set (16B-1) was not able to be transmitted off the aircraft 12. Due to this being a test after maintenance was performed, this was an unscheduled aircraft event with respect to the $3^{rd}$ part Flight Path database and there was no captured flight path. Given that the full flight 2 (16B-2) was received, the T5 value can be extrapolated to determine a synthesized value of T4. The synthesized value of T4 can then be used as the input to the analytics module 54. With the appearance of maintenance records 16E, metrics trending with respect to T4 exceedances may be reset and resume trending as additional flight data arrives.

FIG. 7 schematically illustrates an example computing device 300 that may be used in the data management system 10 of FIG. 1. The computing device includes processing circuitry 302 operatively connected to a communication interface 304 and to memory 306.

The processing circuitry 302 is configured to carry out some or all of the of method 200, and may include one or more microprocessors, microcontrollers, application specific integrated circuits (ASICs), or the like, for example. As used herein, the term "processing circuitry" is not limited to a single computing device, and may connote processing functionality spread across multiple devices (e.g., across multiple servers).

The communication interface 304 is configured to facilitate communication between the computing device 300 and other devices 310 (e.g., those from which the various data sets 16 are received).

The memory 306 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 306 may incorporate electronic, magnetic, optical, and/or other types of storage media. The memory 306 can also have a distributed architecture, where various components are situated remotely from one another, but can be accessed by the processor 302.

The flight linking module 42, analytics module 54, and search engine 58 maybe provided on a single computing device 300, or on a plurality of computing devices 300. As used herein, it is understood that "processing circuitry" may refer to a single computing device 300 (as shown in FIG. 6), or processing circuitry on a plurality of computing devices 300.

The teachings disclosed herein enable real-time or near real-time processing for data set correlation, which in turn enables the performance of analytics as the data sets are received (e.g., as discussed in FIG. 2), without all data sets being made available. This allows the utilization of as much information is available while the aircraft may still be in air, and has not finished generating subsequential reports. Additionally, the teachings disclosed herein enable the correlation of a wide variety of data types, even without flight identifiers being included in the received data sets.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method of providing access to flight-related data of aircraft, comprising:
correlating a plurality of data sets that are different from each other and each contain flight-related data for one or more aircraft engines, to determine a plurality of flights of the one or more aircraft engines that correspond to the plurality of data sets, at least a portion of the flight-related data describing operation of the aircraft engines during the plurality of flights, wherein the correlating is performed based on metadata of the plurality of data sets, and the plurality of data sets includes a plurality of first data sets that utilize a plurality of different schemas;
creating, for each of the plurality of flights and based on the correlating, a respective flight object that represents the flight and includes a plurality of discrete flight data objects that each correspond to a respective one of the plurality of data sets for the flight; and
utilizing the flight object for one of the flights to provide access to one or more of the data sets for said one of the flights;
wherein the plurality of data sets includes:
a plurality of snapshot data sets corresponding to discrete events or portions of the plurality of flights; and
a plurality of full flight data sets that include data for entire ones of the plurality of flights.

2. The method of claim 1, wherein the plurality of data sets also includes a plurality of second data sets that utilize one or more data formats that are different from one or more data formats of the plurality of first data sets.

3. The method of claim 1, wherein the metadata that said correlating is performed based on includes serial numbers of the aircraft engines, and includes at least one of flight origins, flight destinations, and timestamps for the flights.

4. The method of claim 1, comprising:
providing a search engine for accessing the plurality of data sets based on the flight objects;
wherein said utilizing the flight object is performed in response to a request to the search engine that identifies said one of the flights or one of the aircraft.

5. The method of claim 1, wherein each flight data object describes the content and location of its corresponding data set.

6. The method of claim 1, wherein each flight object includes a flight data object for at least one snapshot data set and a flight data object for at least one full flight data set.

7. The method of claim 1, wherein said correlating includes:
determining that a particular snapshot data set and a particular full flight data set that each identify a same aircraft engine both correspond to a particular flight of the plurality of flights for the aircraft engine based on a timestamp of the particular snapshot data set being between a start time and end time for said particular full flight data set.

8. The method of claim 1, wherein said correlating includes:
determining that a first snapshot data set and a second snapshot data set that each identify a same aircraft engine both correspond to a particular flight of the plurality of flights based on:
the first snapshot data set corresponding to a first event or first portion of the particular flight and occurring at a first time; and
the second snapshot data set corresponding to a second event or second portion of the particular flight and occurring at a second time that is within an expected time window for the second event or second portion after said first event or first portion.

9. The method of claim 1, wherein the plurality of first data sets are from a plurality of different sources, and different ones of the schemas correspond to different ones of the sources.

10. The method of claim 1, wherein said utilizing the flight object for one of the flights to provide access to one or more of the data sets for said one of the flights includes:
determining a subset of the plurality of the datasets that correspond to a particular flight;
performing analytics for the particular flight based on the determined subset of the plurality of data sets; and
linking results of the analytics for the flight with the flight object for the flight.

11. A system for aircraft data management, comprising:
processing circuitry operatively connected to memory and configured to:
correlate a plurality of data sets that are different from each other and each contain flight-related data for one or more aircraft engines, to determine a plurality of flights of the one or more aircraft engines that correspond to the plurality of data sets, at least a portion of the flight-related data describing operation of the aircraft engines during the plurality of flights, wherein the correlation is performed based on metadata of the plurality of data sets, and the plurality of data sets includes a plurality of first data sets that utilize a plurality of different schemas;
create, for each of the plurality of flights and based on the correlating, a respective flight object that represents the flight and includes a plurality of discrete flight data objects that each correspond to a respective one of the plurality of data sets for the flight; and
utilize the flight object for one of the flights to provide access to one or more of the data sets for said one of the flights;
wherein the plurality of data sets includes:
a plurality of snapshot data sets corresponding discrete events or portions of the plurality of flights; and
a plurality of full flight data sets that include data from flight recorders for entire ones of the plurality of flights.

12. The system of claim 11, wherein the plurality of data sets also includes a plurality of second data sets that utilize one or more data formats that are different from one or more data formats of the plurality of first data sets.

13. The system of claim 11, wherein the metadata that the correlation is based on includes serial numbers of the aircraft engines, and includes at least one of flight origins, flight destinations, and timestamps for the flights.

14. The system of claim 11, wherein each flight data object describes the content and location of its corresponding data set.

15. The system of claim 12, wherein as part of the correlation, the processing circuitry is configured to:
determine that a particular snapshot data set and a particular full flight data set that each identify a same engine both correspond to a particular flight of the plurality of flights for the engine based on a timestamp of the particular snapshot data set being between a start time and end time for said particular full flight data set.

16. The system of claim 11, wherein as part of the correlation, the processing circuitry is configured to:
determine that a first snapshot data set and a second snapshot data set that each identify a same engine both correspond to a particular flight of the plurality of flights based on:
the first snapshot data set corresponding to a first event or first portion of the particular flight and occurring at a first time; and
the second snapshot data set corresponding to a second event or second portion of the particular flight and occurring at a second time that is within an expected time window for the second event or second portion after said first event or first portion.

17. The system of claim 11, wherein the plurality of first data sets are from a plurality of different sources, and different ones of the schemas correspond to different ones of the sources.

18. The system of claim 11, as part of the utilization of the flight object for one of the flights to provide access to one or more of the data sets for said one of the flights, processing circuitry is configured to:
determine a subset of the plurality of the datasets that correspond to a particular flight;
perform analytics for the particular flight based on the determined subset of the plurality of data sets; and
link results of the analytics for the flight with the flight object for the flight.

* * * * *